United States Patent
Tsutaoka

(10) Patent No.: US 12,327,396 B2
(45) Date of Patent: Jun. 10, 2025

(54) IMAGE PROCESSING DEVICE, IMAGE PROCESSING METHOD, AND PROGRAM

(71) Applicant: FUJIFILM Corporation, Tokyo (JP)

(72) Inventor: Takuya Tsutaoka, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 519 days.

(21) Appl. No.: 17/930,382

(22) Filed: Sep. 7, 2022

(65) Prior Publication Data
US 2023/0074314 A1   Mar. 9, 2023

(30) Foreign Application Priority Data

Sep. 8, 2021 (JP) ................................. 2021-146310

(51) Int. Cl.
*G06T 7/00* (2017.01)
*G06V 10/774* (2022.01)
*G06V 20/40* (2022.01)

(52) U.S. Cl.
CPC .......... *G06V 10/774* (2022.01); *G06T 7/0012* (2013.01); *G06V 20/41* (2022.01); *G06T 2207/10016* (2013.01); *G06T 2207/10068* (2013.01); *G06T 2207/20081* (2013.01); *G06T 2207/30096* (2013.01); *G06V 2201/031* (2022.01)

(58) Field of Classification Search
None
See application file for complete search history.

(56) References Cited

U.S. PATENT DOCUMENTS

| 2004/0044269 A1* | 3/2004 | Shibata | G16H 40/63 600/101 |
| 2020/0279373 A1* | 9/2020 | Hussain | G16H 50/20 |
| 2020/0320702 A1* | 10/2020 | Kamon | A61B 1/0638 |
| 2023/0077690 A1* | 3/2023 | Tsutaoka | G06V 10/772 382/128 |
| 2023/0245311 A1* | 8/2023 | Takahashi | A61B 1/00055 382/128 |

FOREIGN PATENT DOCUMENTS

JP   2020-030565 A   2/2020

* cited by examiner

*Primary Examiner* — Dov Popovici
(74) *Attorney, Agent, or Firm* — Studebaker Brackett PLLC

(57) ABSTRACT

There are provided an image processing device, an image processing method, and a program that can accurately select normal images suitable for learning without visually selecting learning data by a human. An image processing device includes a processor, and the processor acquires an examination video picked up by an endoscope apparatus, acquires instructional information of the endoscope apparatus in the pickup of the examination video, specifies a learning frame section from a plurality of frames forming the examination video on the basis of the instructional information, and outputs a frame group of the learning frame section as first learning data.

15 Claims, 13 Drawing Sheets

FIG. 5

| | Q |
|---|---|
| 11:50:00 | START OF EXAMINATION |
| 12:00:00 | REACH ILEOCECUM (PRESS IMAGE PICKUP START BUTTON) |
| 12:10:00 | START OF WATER SUPPLY |
| 12:10:10 | END OF WATER SUPPLY |
| 12:20:00 | PICKING UP STATIC IMAGE |
| 12:25:00 | FIRST LIGHT SOURCE SWITCHING |
| 12:25:30 | SECOND LIGHT SOURCE SWITCHING |
| 12:30:00 | END OF EXAMINATION |

IMAGE PROCESSING DEVICE, IMAGE PROCESSING METHOD, AND PROGRAM

CROSS-REFERENCE TO RELATED APPLICATION

The present application claims priority under 35 U.S.C § 119(a) to Japanese Patent Application No. 2021-146310 filed on Sep. 8, 2021, which is hereby expressly incorporated by reference, in its entirety, into the present application.

BACKGROUND OF THE INVENTION

1. Field of the Invention

The present invention relates to an image processing device, an image processing method, and a program, and more particularly, to an image processing device, an image processing method, and a program that output learning data from an examination video.

2. Description of the Related Art

A method of training artificial intelligence (AI: learning model) using a lot of images (learning data) and teacher data is known as a method of identifying or detecting an abnormal region, such as a lesion area, from an image. Generally, in a case where a lot of learning data is prepared, AI can be trained to have higher performance. However, most of images acquired in a medical field including endoscopy are the images of normal subjects not including lesion areas, and there are few opportunities to obtain the images of lesion areas. Further, since the types of lesions are often biased even if the images of lesion areas can be obtained, it is often difficult to prepare a lot of learning data for various types of lesion areas.

Accordingly, a method of training AI using the images of normal subjects that can be easily obtained as described above has been proposed.

For example, JP2020-30565A discloses a technique for performing machine learning using learning image data that are a positive example.

SUMMARY OF THE INVENTION

Here, in a case where a lot of normal images suitable for machine learning are provided to AI, highly accurate AI can be obtained. The normal images suitable for machine learning are images in which a lesion area and a treatment tool are not shown and a normal mucous membrane can be visually recognized clearly (images in which user's operations, such as air supply, water supply, staining, and the high-speed movement of a scope, are not performed).

However, an examination video is formed of tens of thousands to hundreds of thousands of frames, and work for selecting normal images suitable for learning from the examination video is often visually performed by a human, which requires a huge amount of time.

The present invention has been made in consideration of the above-mentioned circumstances, and an object of the present invention is to provide an image processing device, an image processing method, and a program that can accurately select normal images suitable for learning without visually selecting learning data by a human.

In order to achieve the object, an image processing device according to an aspect of the present invention is an image processing device comprising a processor, and the processor acquires an examination video picked up by an endoscope apparatus, acquires instructional information of the endoscope apparatus in the pickup of the examination video, specifies a learning frame section from a plurality of frames forming the examination video on the basis of the instructional information, and outputs a frame group of the learning frame section as first learning data.

According to this aspect, the learning frame section is specified on the basis of the instructional information and the frame group of the specified learning frame section is output as the first learning data. Accordingly, in this aspect, it is possible to accurately select images suitable for learning without visually selecting learning data by a human.

Preferably, the processor specifies a section, in which a special operation is not performed, as the learning frame section on the basis of the instructional information.

Preferably, the instructional information includes observation start information indicating that an observation is started, and the processor specifies the learning frame section on the basis of the observation start information.

Preferably, the instructional information includes detection information indicating that a specific portion of an organ to be examined is detected, and the processor specifies the learning frame section on the basis of the detection information.

Preferably, the instructional information includes special instructional information indicating at least one of execution of water supply, execution of air supply, execution of suction, light source switching, a use of a treatment tool, execution of staining, or special insertion, and the processor specifies the learning frame section on the basis of the special instructional information.

Preferably, the processor specifies the learning frame section on the basis of a plurality of pieces of the special instructional information.

Preferably, the instructional information includes information about a time-series insertion length of a scope of the endoscope apparatus, and the processor specifies the learning frame section in a case where an amount of change in the insertion length is in a range of a first threshold value.

Preferably, the instructional information includes static image pickup information indicating that a static image is picked up by the endoscope apparatus, and the processor specifies the learning frame section on the basis of the static image pickup information.

Preferably, the processor recognizes an operation situation of the endoscope apparatus on the basis of the frames forming the examination video and specifies the learning frame section on the basis of a result of the recognition.

According to this aspect, the operation situation of the endoscope apparatus is recognized on the basis of the frames forming the examination video and the learning frame section is specified on the basis of the result of the recognition.

Preferably, the processor recognizes the operation situation of the endoscope apparatus by detecting a specific portion of an organ to be examined on the basis of the frames forming the examination video and specifies a section, which is subsequent to the frame in which the specific portion is recognized, as the learning frame section.

Preferably, the processor recognizes the operation situation of the endoscope apparatus by detecting at least one special operation of execution of water supply, execution of suction, light source switching, a use of a treatment tool, execution of staining, or special insertion on the basis of the frames forming the examination video and specifies frames other than the frame, in which the special operation is recognized, as the learning frame section.

Preferably, the processor recognizes the operation situation of the endoscope apparatus by recognizing each portion of an organ to be examined on the basis of the frames forming the examination video and specifies the learning frame section on the basis of a result of the recognition.

Preferably, the processor inputs the output first learning data to a lesion detector that detects a lesion, and outputs frames other than a frame, in which a lesion is detected by the lesion detector, as second learning data.

An image processing method according to another aspect of the present invention is an image processing method of an image processing device including a processor, and the processor performs a step of acquiring an examination video picked up by an endoscope apparatus, a step of acquiring instructional information of the endoscope apparatus in the pickup of the examination video, a step of specifying a learning frame section from a plurality of frames forming the examination video on the basis of the instructional information, and a step of outputting a frame group of the learning frame section as first learning data.

A program according to still another aspect of the present invention is a program causing an image processing device, which includes a processor, to perform an image processing method; and the program causes the processor to perform a step of acquiring an examination video picked up by an endoscope apparatus, a step of acquiring instructional information of the endoscope apparatus in the pickup of the examination video, a step of specifying a learning frame section from a plurality of frames forming the examination video on the basis of the instructional information, and a step of outputting a frame group of the learning frame section as first learning data.

According to the present invention, since the learning frame section is specified on the basis of the instructional information and the frame group of the specified learning frame section is output as the first learning data, it is possible to accurately select images suitable for learning without visually selecting learning data by a human.

BRIEF DESCRIPTION OF THE DRAWINGS

FIG. 5 is a diagram showing operation logs related to the pickup of an examination video.

DESCRIPTION OF THE PREFERRED EMBODIMENTS

An image processing device, an image processing method, and a program according to preferred embodiments of the present invention will be described below with reference to the accompanying drawings.

First Embodiment

Figure 1:
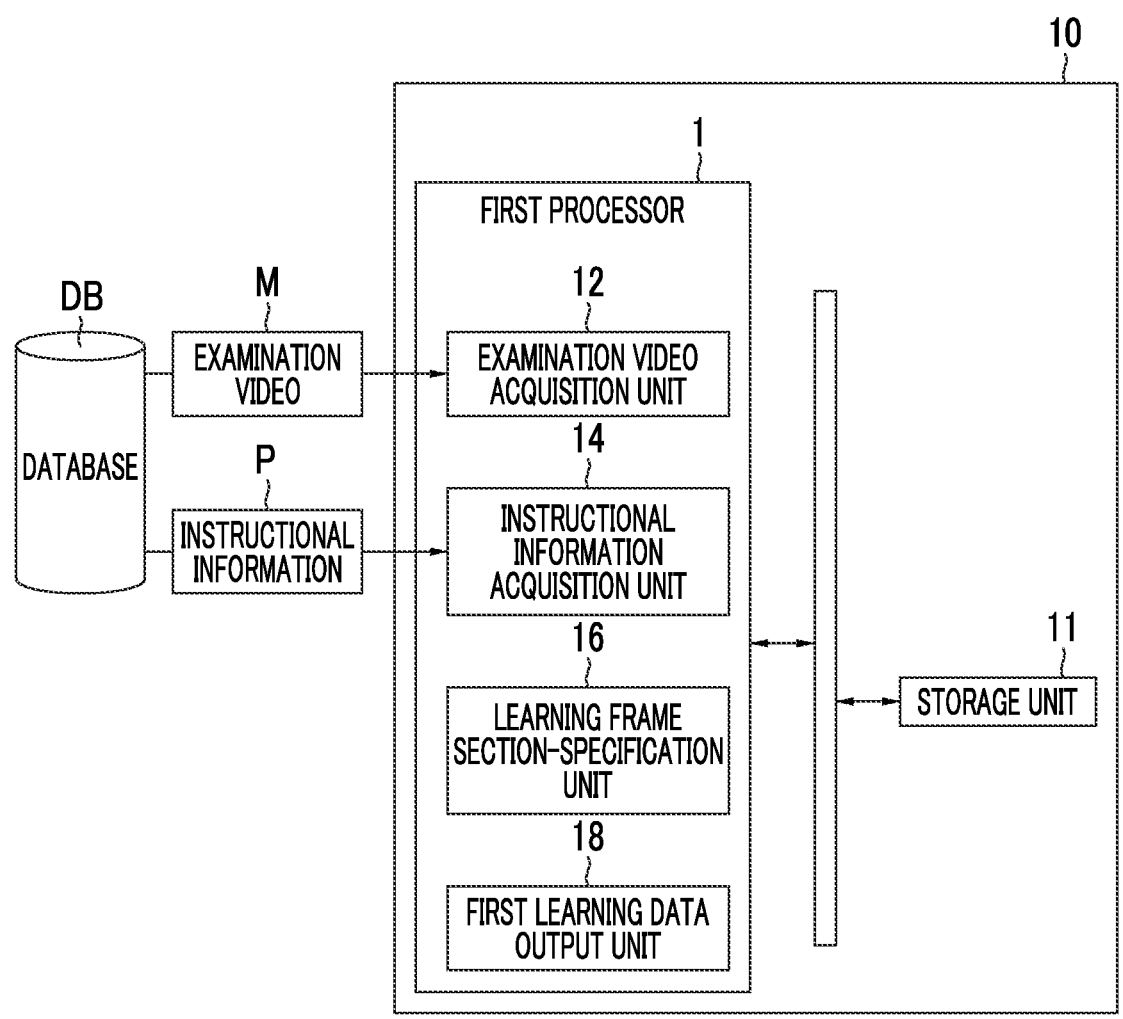
FIG. 1 is a block diagram showing the main configuration of an image processing device.

FIG. 1 is a block diagram showing the main configuration of an image processing device 10 according to this embodiment.

The image processing device 10 is mounted on, for example, a computer. The image processing device 10 mainly comprises a first processor (processor) 1 and a storage unit 11. The first processor 1 is formed of a central processing unit (CPU) or a graphics processing unit (GPU) that is mounted on the computer. The storage unit 11 is formed of a read only memory (ROM) and a random access memory (RAM) that are mounted on the computer.

The first processor 1 realizes various functions by executing a program stored in the storage unit 11. The first processor 1 functions as an examination video acquisition unit 12, an instructional information acquisition unit 14, a learning frame section-specification unit 16, and a first learning data output unit 18.

The examination video acquisition unit 12 acquires an examination video M, which is picked up by an endoscope apparatus 500 (see FIGS. 13 and 14), from a database DB. The examination video M is input via a data input unit of the computer that forms the image processing device 10. Then, the examination video acquisition unit 12 acquires the input examination video M.

The instructional information acquisition unit 14 acquires instructional information P of the endoscope apparatus 500 in the pickup of the examination video M from the database DB. The instructional information P is input via the data input unit of the computer that forms the image processing device 10. Then, the instructional information acquisition unit 14 acquires the input instructional information P.

The examination video M and the instructional information P are output from the endoscope apparatus 500 and are stored in the database DB. An operation in a case where the examination video M is picked up is recorded in the instructional information P together with a time point. The instructional information P and the examination video M are recorded in the database DB in association with each other. A lot of examination videos and instructional information are recorded in the database DB. An aspect in which the image processing device 10 acquires the examination video M and the instructional information P from the database DB is illustrated in FIG. 1, but the present invention is not limited thereto. For example, the examination video M and the instructional information P may be directly acquired from the endoscope apparatus 500.

Figure 2:
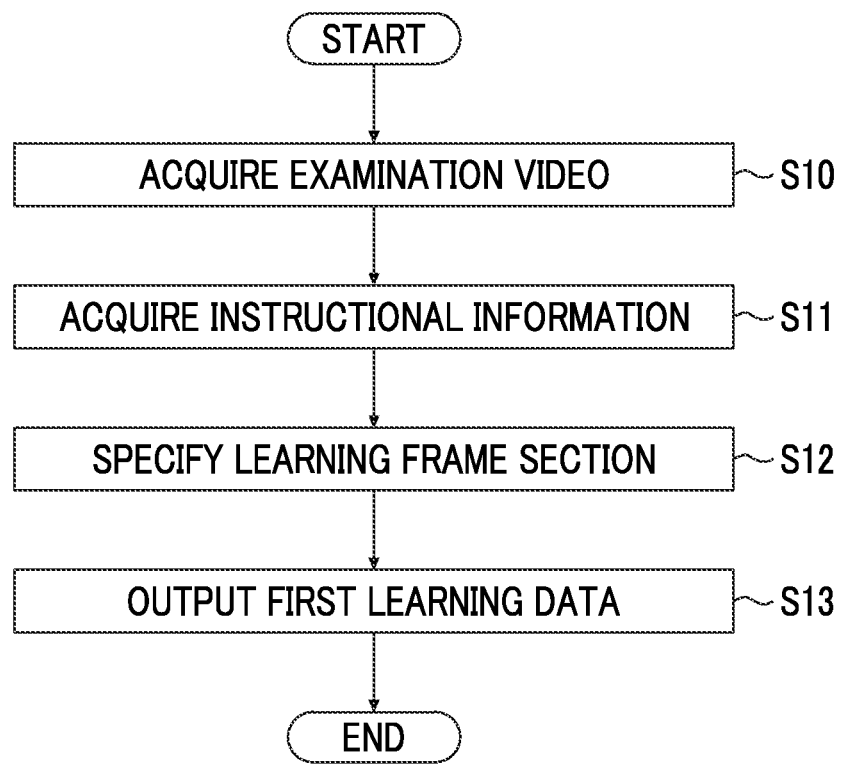
FIG. 2 is a flowchart showing an image processing method that is performed using the image processing device.

FIG. 2 is a flowchart showing an image processing method that is performed using the image processing device 10 according to this embodiment. The first processor 1 of the image processing device 10 executes a program stored in the storage unit 11, so that the image processing method is performed.

First, the examination video acquisition unit 12 acquires the examination video M (video acquisition step: Step S10). Further, the instructional information acquisition unit 14 acquires the instructional information P that is acquired from the endoscope apparatus 500 of the examination video M (instructional information acquisition step: Step S11). After that, the learning frame section-specification unit 16 specifies learning frame sections from a plurality of frames forming the examination video M on the basis of the instructional information P (learning frame section-specification step: Step S12). Then, the first learning data output unit 18 outputs frame groups of the learning frame sections as first learning data (first learning data-output step: Step S13). Each step described above will be described in detail below.

Video Acquisition Step

First, the video acquisition step (Step S10) performed by the examination video acquisition unit 12 will be described.

The examination video acquisition unit 12 acquires the video of an examination (examination video M) picked up by the endoscope apparatus 500. The examination video acquisition unit 12 can acquire the videos of various examinations. For example, the examination video acquisition unit 12 acquires the examination video of the examination of the large intestine that is acquired by a lower endoscope apparatus, or acquires the examination video of the examination of the stomach that is acquired by an upper endoscope apparatus. The examination videos are picked up at various frame rates. For example, the examination video M is picked up at 30 fps (frames per second) or 60 fps.

Figure 3:
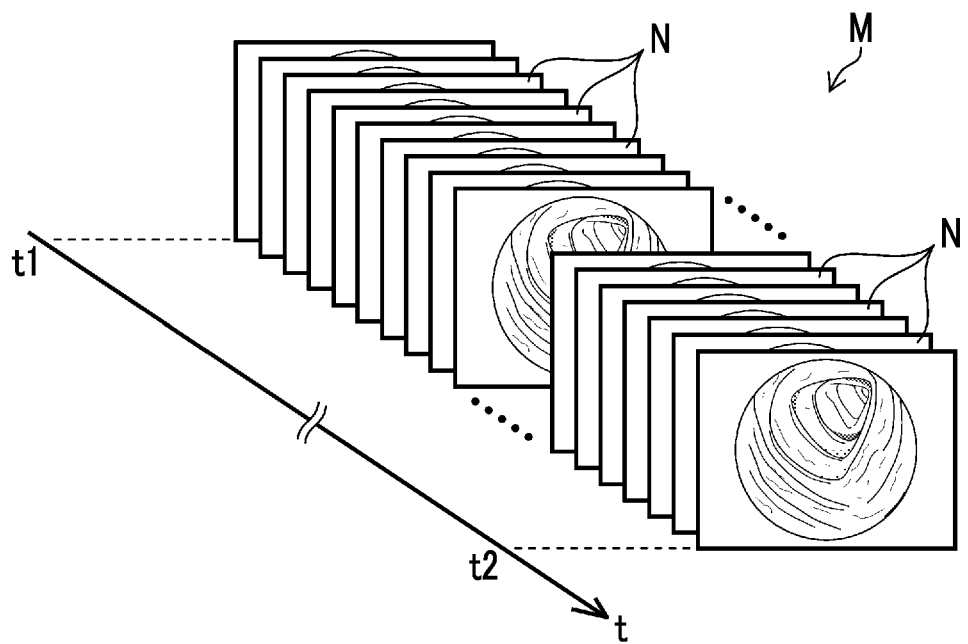
FIG. 3 is a diagram illustrating an examination video.

FIG. 3 is a diagram illustrating the examination video M that is acquired by the examination video acquisition unit 12. The examination video M is the examination video of an examination performed on the large intestine that is picked up by a lower endoscope apparatus.

As shown in FIG. 3, the examination video M is a video related to an examination that is performed between a time point t1 and a time point t2. The examination video M is formed of a plurality of consecutive time-series frames N, and each frame N has information about a time point when the video is picked up. The examination video M includes a frame N including a normal image suitable for machine learning and a frame N including an abnormal image that is not the normal image.

Figure 4:
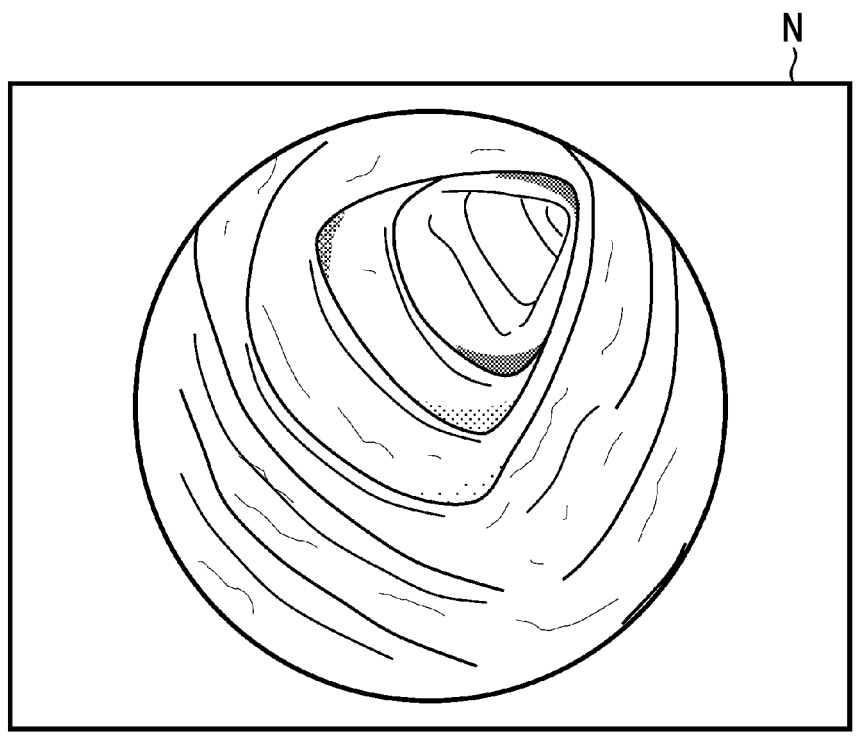
FIG. 4 is a diagram showing an example of a normal image suitable for machine learning.

FIG. 4 is a diagram showing an example of a normal image suitable for machine learning.

The normal image shown in FIG. 4 is an example of a normal image that is acquired in the examination of the large intestine with the lower endoscope apparatus. As described above, a normal image suitable for machine learning is an image in which a lesion area and a treatment tool are not shown and a normal mucous membrane can be visually recognized clearly (an image in which a special operation, such as air supply, water supply, staining, or the high-speed movement of a scope, is not performed).

On the other hand, in contrast to a normal image, an abnormal image is an image in which a lesion area or a treatment tool is shown and a normal mucous membrane cannot be visually recognized clearly (an image in which a special operation, such as air supply, water supply, staining, or the high-speed movement of a scope, is performed).

Instructional Information Acquisition Step

Next, the instructional information acquisition step (Step S11) performed by the instructional information acquisition unit 14 will be described.

The instructional information acquisition unit 14 acquires the instructional information P of the endoscope apparatus 500 in the pickup of the examination video M. The instructional information acquisition unit 14 acquires instructional information P in the pickup of various examination videos M.

For example, the instructional information acquisition unit 14 acquires instructional information P including observation start information indicating that an observation is started in an examination. In a case where an operator observes an object to be examined, the operator inputs the observation start information to the endoscope apparatus 500 with a predetermined input device (for example, a foot pedal or the like) and the endoscope apparatus 500 records the observation start information, which includes a time point when an observation is started, as operation logs Q. Then, the learning frame section-specification unit 16 specifies a learning frame section on the basis of the observation start information.

Further, for example, the instructional information acquisition unit 14 acquires instructional information P including detection information indicating that a specific portion of an organ to be examined is detected. In a case where the specific portion of the organ to be examined is detected, the operator inputs the detection information to the endoscope apparatus 500 with a predetermined input device (for example, a button or the like provided on an endoscope body 100 (FIG. 13)) and the endoscope apparatus 500 records the detection information, which includes a time point when the specific portion of the organ to be examined is detected, as operation logs Q. Then, the learning frame section-specification unit 16 specifies a learning frame section on the basis of the detection information.

Furthermore, for example, the instructional information acquisition unit 14 acquires instructional information P including special instructional information indicating at least one of the execution of water supply, the execution of air supply, the execution of suction, light source switching, the use of a treatment tool, the execution of staining, or special insertion. The special instructional information is input using a button or the like provided on the endoscope body 100 as described below, and the endoscope apparatus 500 records each information as operation logs Q. Then, the learning frame section-specification unit 16 specifies a learning frame section on the basis of the special instructional information.

The execution of water supply is to discharge water (or liquid) from a water supply nozzle of a hard distal end part 116 (FIG. 13) of the endoscope apparatus 500, and the operator presses, for example, an air/water supply button 141, which is provided on the endoscope body 100 of the endoscope apparatus 500, to execute water supply.

Further, the execution of air supply is to jet air from an air supply nozzle of the hard distal end part 116 (FIG. 13) of the endoscope apparatus 500, and the operator presses, for example, the air/water supply button 141, which is provided on the endoscope body 100 of the endoscope apparatus 500, to execute air supply.

Furthermore, the execution of suction is to perform suction from the hard distal end part 116 of the endoscope apparatus 500, and the operator presses, for example, a suction button 142, which is provided on the endoscope body 100 of the endoscope apparatus 500, to execute suction.

Moreover, light source switching is to switch a light source of the endoscope apparatus 500, and the operator presses, for example, a light source switching button (not shown), which is provided on the endoscope body 100 of the endoscope apparatus 500, to switch a light source. For example, the operator presses the light source switching button to switch a light source from normal light to special light.

Further, the use of a treatment tool is to insert a treatment tool from a forceps port 126 of the hard distal end part 116 of the endoscope apparatus 500 to perform treatment. In a case where a treatment tool is used, the endoscope body 100 sends a time point when the treatment tool is used to the endoscope apparatus 500 and the endoscope apparatus 500 records the time point as operation logs Q.

Furthermore, the execution of staining is to jet dye from the hard distal end part 116 of the endoscope apparatus 500, and the operator presses, for example, a staining execution button (not shown), which is provided on the endoscope body 100 of the endoscope apparatus 500, to stain a part of the organ to be examined. For example, since a part of the organ to be examined is stained, a lesion area or an abnormal area can be easily detected.

Moreover, special insertion is a case where a scope (insertion unit) 104 of the endoscope apparatus 500 is inserted in a special form. Usually, in a case where the scope 104 is inserted into the organ to be examined, the scope 104 is linearly moved. However, in some organs to be examined, for example, a twist operation or the like may be performed to insert the scope 104 instead of the linear movement of the scope 104. Particularly, in the examination of the large intestine, the scope 104 should be inserted according to the shape of the large intestine and special insertion is often performed. For example, a gyro sensor is mounted on the endoscope body 100 of the endoscope apparatus 500, the endoscope body 100 detects that special insertion is performed, and the endoscope apparatus 500 records a time point when the special insertion is performed in operation logs Q.

Learning frame sections to be described later may be specified on the basis of the plurality of pieces of special instructional information described above. For example, in a case where the execution of water supply and the use of a treatment tool are performed, a learning frame section is not specified. Further, the special operation described above is a specific example and the contents of the special operation are not particularly limited thereto.

Furthermore, for example, the instructional information acquisition unit 14 acquires instructional information P including information about the time-series insertion length of the scope 104 of the endoscope apparatus 500. The scope 104 is provided with a sensor (not shown), and the endoscope apparatus 500 records the amount of change in the insertion length of the scope 104 in operation logs Q on the basis of a signal output from the sensor. In a case where the information about the time-series insertion length of the scope 104 is used, a section in which camera shake or subject shake is severe or a section in which the scope is too close to the mucous membrane can be excluded from the learning frame sections. For example, in a case where the amount of change in the insertion length of the scope 104 is in the range of a first threshold value, it is determined that the scope 104 is being moved normally. Accordingly, a learning frame section is specified by the learning frame section-specification unit 16.

Further, for example, the instructional information acquisition unit 14 acquires instructional information P including static image pickup information indicating that a static image is picked up by the endoscope apparatus 500. The operator picks up the static image of, for example, a lesion area or a portion presumed to be a lesion during an examination. The operator presses, for example, an image pickup button 144, which is provided on the endoscope body 100 of the endoscope apparatus 500, to pick up a static image. The endoscope apparatus 500 records the static image pickup information, which includes a time point when the static image is picked up, as operation logs Q. Then, the learning frame section-specification unit 16 specifies a learning frame section on the basis of the static image pickup information.

As described above, the instructional information acquisition unit 14 acquires the instructional information P of the endoscope apparatus 500 in the pickup of various examination videos M. For example, the instructional information acquisition unit 14 acquires the operation logs Q in which the plurality of pieces of instructional information P described above are recorded.

The operation logs Q will be specifically described below.

FIG. 5 is a diagram showing the operation logs Q related to the pickup of the examination video M.

The operation logs Q are operation logs Q in lower endoscopy. The contents of operations and time points (hour: minute: second) when the operations are performed are shown in the operation logs Q.

According to the operation logs Q, "the start of an examination" is performed at a time point of 11:50:00. Here, the start of an examination means that the endoscope apparatus 500 starts to pick up the examination video M and to record the examination video M. The start of an examination is performed in a case where an image pickup start button for the examination video M is pressed. Accordingly, the endoscope apparatus 500 records the start of an examination in the operation logs Q together with the time point.

According to the operation logs Q, "reaching the ileocecum" is performed at a time point of 12:00:00. In a case where the operator confirms that a distal end of the scope 104 reaches the ileocecum using a display device 400 on which an endoscopic image is displayed, the operator presses, for example, the foot pedal to input "reaching the ileocecum". Accordingly, the endoscope apparatus 500 records reaching the ileocecum in the operation logs Q together with the time point.

According to the operation logs Q, "the start of water supply" is performed at a time point of 12:10:00. The operator presses the air/water supply button 141 to supply water. Accordingly, the endoscope apparatus 500 records the start of water supply in the operation logs Q together with the time point.

According to the operation logs Q, "the end of water supply" is performed at a time point of 12:10:10. The operator presses the air/water supply button 141 again to end water supply. Accordingly, the endoscope apparatus 500 records the end of water supply in the operation logs Q together with the time point.

According to the operation logs Q, "picking up a static image" is performed at a time point of 12:20:00. The operator presses the image pickup button 144 to image a lesion area or a portion presumed to be a lesion area. Accordingly, the endoscope apparatus 500 records "picking up a static image" in the operation logs Q together with the time point.

According to the operation logs Q, "first light source switching" is performed at a time point of 12:25:00. The operator presses the light source switching button (not shown) to switch a light source from normal light to special light. Accordingly, the endoscope apparatus 500 records light source switching in the operation logs Q together with the time point.

According to the operation logs Q, "second light source switching" is performed at a time point of 12:25:30. The operator presses the light source switching button (not shown) to switch a light source from special light to normal light. Accordingly, the endoscope apparatus 500 records light source switching in the operation logs Q together with the time point.

According to the operation logs Q, "the end of an examination" is performed at a time point of 12:30:00. The operator presses an examination end button of the endoscope apparatus 500 to end an examination. Accordingly, the endoscope apparatus 500 records the end of an examination in the operation logs Q together with the time point.

As described above, the operation logs Q include the plurality of various pieces of instructional information P. The above-mentioned operation logs Q are a specific example and operation logs are not limited thereto.

Learning Frame Section-Specification Step

Next, the learning frame section-specification step (Step S12) performed by the learning frame section-specification unit 16 will be described.

The learning frame section-specification unit 16 specifies the learning frame sections from a plurality of frames, which form the examination video M, on the basis of the instructional information P that is acquired by the instructional information acquisition unit 14. Specifically, the learning frame section-specification unit 16 specifies a section in which the special operation is not performed as a learning frame section on the basis of the instructional information P. Accordingly, the learning frame section is formed of frames including normal images suitable for machine learning.

Figure 6:
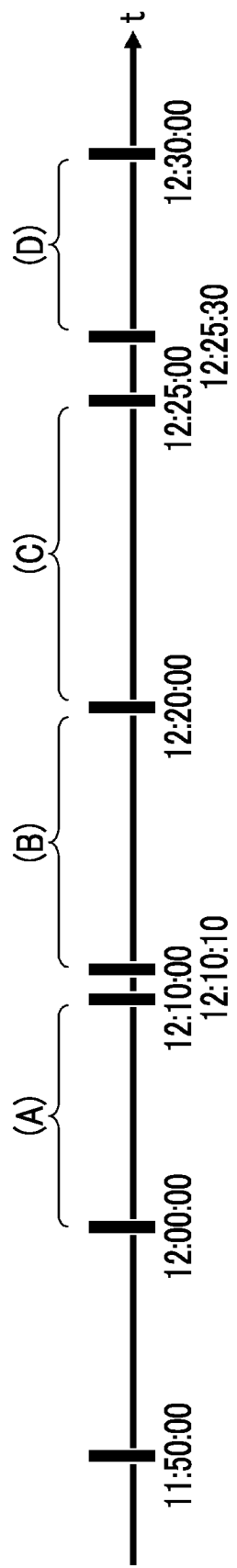
FIG. 6 is a diagram illustrating learning frame sections.

FIG. 6 is a diagram illustrating the learning frame sections.

Learning frame sections (A) to (D) specified from the examination video M on the basis of the operation logs Q are shown in FIG. 6. Further, the instructional information P recorded in the operation logs Q is shown in FIG. 6 together with the time points.

The learning frame section-specification unit 16 does not specify a section between the start of an examination (11:50:00) and reaching the ileocecum (12:00:00) in the examination video M as a learning frame section. A stage between the start of an examination and reaching the ileocecum is a stage in which the scope 104 is inserted into the innermost portion of the large intestine, and is a so-called examination preparation stage. In this case, the insertion speed of the scope may be different from a normal insertion speed, special insertion may be performed, or an object to be examined may not be appropriately shown in the images included in frames. That is, an abnormal image is likely to be included in a frame group forming this section. Accordingly, the learning frame section-specification unit 16 does not specify the section between the start of an examination and reaching the ileocecum as a learning frame section.

The learning frame section-specification unit 16 specifies a section between reaching the ileocecum (12:00:00) and the start of water supply (12:10:00) in the examination video M as the learning frame section (A). After the scope 104 reaches the ileocecum, the examination (observation) of the large intestine is performed while the scope 104 is removed. Then, it is thought that a normal image is acquired until the next special operation is performed. Accordingly, the learning frame section-specification unit 16 specifies the section between reaching the ileocecum and the start of water supply as the learning frame section (A).

Since a special operation (water supply) is performed in a section between the start of water supply (12:10:00) and the end of water supply (12:10:10), the learning frame section-specification unit 16 does not specify the section as a learning frame section. An abnormal image in which an act for supplying water is shown is likely to be included in the frames of this section. Accordingly, the learning frame section-specification unit 16 does not specify the section between the start of water supply and the end of water supply as a learning frame section.

The learning frame section-specification unit 16 specifies a section between the end of water supply (12:10:10) and picking up a static image (12:20:00) as the learning frame section (B). The section between the end of water supply and picking up a static image is a section in which a special operation is not particularly performed in the operation logs Q, and is likely to be formed of only normal images. Accordingly, the learning frame section-specification unit 16 specifies the section between the end of water supply and picking up a static image as the learning frame section (B).

The learning frame section-specification unit 16 does not specify a plurality of frames, which form a time when a static image is picked up, as a learning frame section. Since an abnormal image in which a variant portion, such as a lesion area, is shown is likely to be obtained in a case where a static image is picked up, the learning frame section-specification unit 16 does not specify frames, which are obtained at the time of picking up a static image, as a learning frame section.

The learning frame section-specification unit 16 specifies a section between picking up a static image (12:20:00) and light source switching (12:25:00) as the learning frame section (C). The section between picking up a static image and light source switching is a section in which a special operation is not particularly performed in the operation logs Q, and is likely to be formed of only normal images. Accordingly, the learning frame section-specification unit 16 specifies the section between picking up a static image and light source switching as the learning frame section (C).

The learning frame section-specification unit 16 does not specify a section between first light source switching (12:25:00) and second light source switching (12:25:30) as a learning frame section. Since a case where an examination is performed using special light as a light source corresponds to a section in which a special operation is performed, an abnormal image is likely to be included in the section. Accordingly, the learning frame section-specification unit 16 does not specify the section between first light source switching and second light source switching as a learning frame section.

Next, the learning frame section-specification unit 16 specifies a section between second light source switching (12:25:30) and the end of an examination (12:30:00) as the learning frame section (D). The section between second light source switching and the end of an examination is a section in which a special operation is not particularly recorded in the operation logs Q, and the frames of this section are likely to be formed of only normal images. Accordingly, the learning frame section-specification unit 16 specifies the section between second light source switching and the end of an examination as a learning frame section.

As described above, the learning frame section-specification unit 16 specifies the sections in which a special operation is not performed (sections in which an abnormal image is not included) as learning frame sections on the basis of the operation logs Q.

First Learning Data-Output Step

Next, the first learning data-output step (Step S13) performed by the first learning data output unit 18 will be described.

The first learning data output unit 18 outputs the frame groups of the learning frame sections as first learning data. Specifically, the first learning data output unit 18 outputs the frame groups corresponding to the learning frame sections (A) to (D) as first learning data. The frame groups forming the learning frame sections (A) to (D) are selected on the basis of the instructional information P and are formed of frames including normal images which are suitable for machine learning and in which a special operation is not performed.

According to the image processing device 10, as described above, the learning frame sections are specified on the basis of the instructional information P and the frame groups of the specified learning frame sections are output as the first learning data. Accordingly, in this aspect, learning data do not need to be visually selected by a human and normal images suitable for learning can be accurately and efficiently selected. Further, according to this aspect, the instructional information P is used and results output from an image recognizer are not used in specifying the learning frame sections. Accordingly, it is possible to suppress the mixing of a frame, which includes an abnormal image, to the learning data due to the false recognition of the image recognizer.

Second Embodiment

Next, a second embodiment will be described. A learning frame section-specification unit 16 of this embodiment specifies learning frame sections on the basis of instructional information P and operation situations recognized by an operation situation recognition unit 20.

Figure 7:
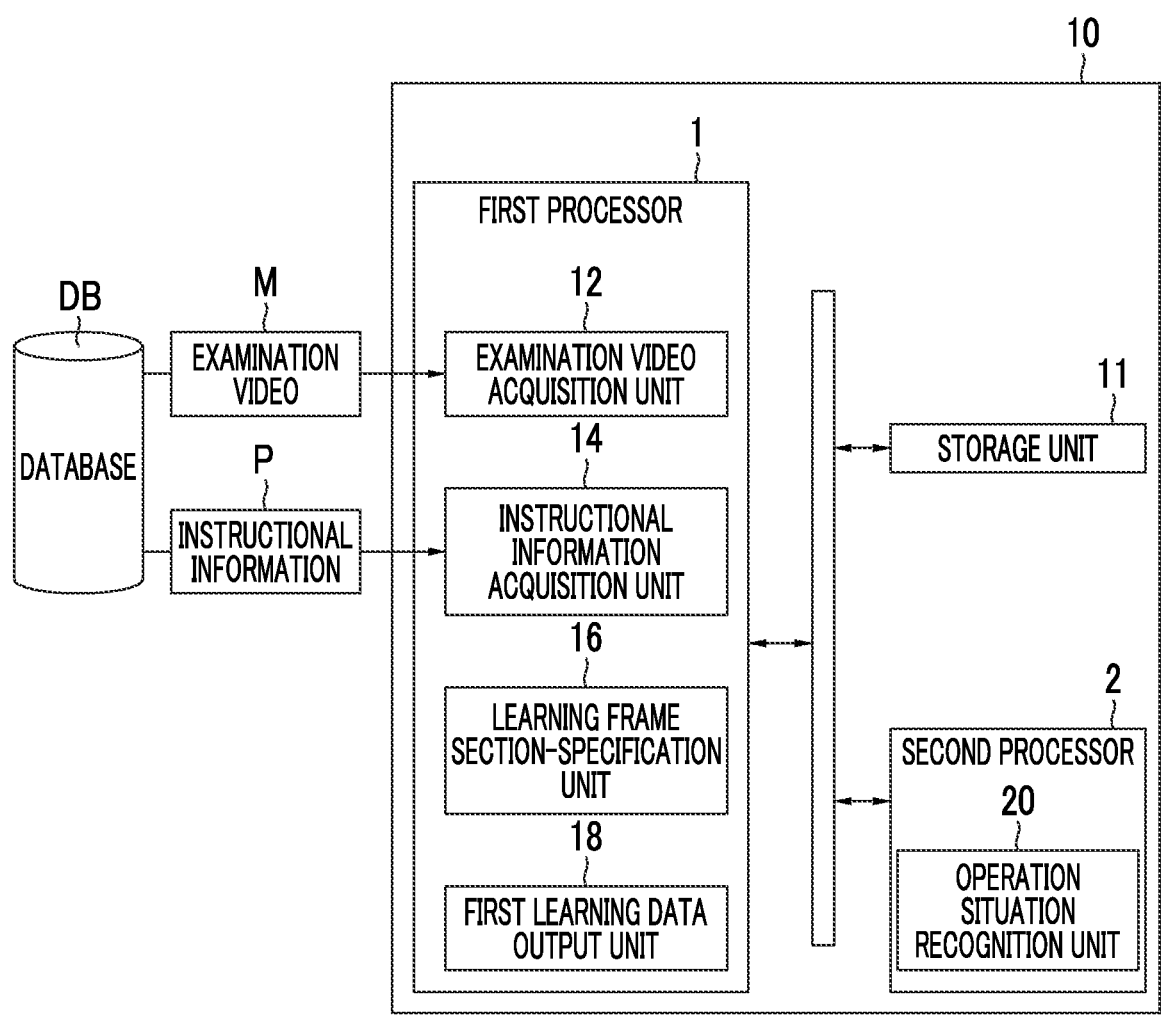
FIG. 7 is a block diagram showing the main configuration of an image processing device.

FIG. 7 is a block diagram showing the main configuration of an image processing device 10 according to this embodiment. Components already described in FIG. 1 will be denoted by the same reference numerals as described above and the description thereof will be omitted.

The image processing device 10 includes a first processor 1, a storage unit 11, and a second processor (processor) 2. The first processor 1 and the second processor 2 may be formed of the same CPUs (or GPUs) or may be formed of different CPUs (or GPUs). The first processor 1 and the second processor 2 realize the respective functions shown in a functional block by executing a program stored in the storage unit 11.

The first processor 1 includes an examination video acquisition unit 12, an instructional information acquisition unit 14, a learning frame section-specification unit 16, and a first learning data output unit 18. The second processor 2 is formed of an operation situation recognition unit 20.

The operation situation recognition unit 20 is formed of a publicly known image recognizer and can recognize various operation situations from an image included in an input frame. The operation situation recognition unit 20 may be formed of one image recognizer or may be formed of a plurality of image recognizers in combination.

For example, the operation situation recognition unit 20 recognizes the operation situation of the endoscope apparatus 500 by detecting a specific portion of an organ to be examined on the basis of the input frame. Then, the learning frame section-specification unit 16 specifies a section, which is subsequent to a frame in which the specific portion is recognized, as a learning frame section. For example, the operation situation recognition unit 20 recognizes an ileocecum from the input frame in lower endoscopy, and the learning frame section-specification unit 16 specifies a section, which is subsequent to a frame in which the ileocecum is recognized, as a learning frame section.

Further, the operation situation recognition unit 20 recognizes the operation situation of the endoscope apparatus 500 by detecting at least one special operation of the execution of water supply, the execution of suction, light source switching, the use of a treatment tool, the execution of staining, or special insertion on the basis of the input frame. Then, the learning frame section-specification unit 16 specifies frames other than a frame, in which the special operation is recognized, as learning frame sections.

Furthermore, the operation situation recognition unit 20 recognizes the operation situation of the endoscope apparatus 500 by recognizing each portion of an organ to be examined on the basis of the input frame. Then, the learning frame section-specification unit 16 specifies a learning frame section on the basis of the result of the recognition. For example, the operation situation recognition unit 20 recognizes the small intestine from the input frame in lower endoscopy, and the learning frame section-specification unit 16 does not specify a section, which includes a frame in which the small intestine is recognized, as a learning frame section. Further, for example, the operation situation recognition unit 20 recognizes the gullet and the stomach from the input frame in upper endoscopy, and the learning frame section-specification unit 16 may specify a learning frame section in which machine learning for the gullet is performed and a learning frame section in which machine learning for the stomach is performed.

Figure 8:
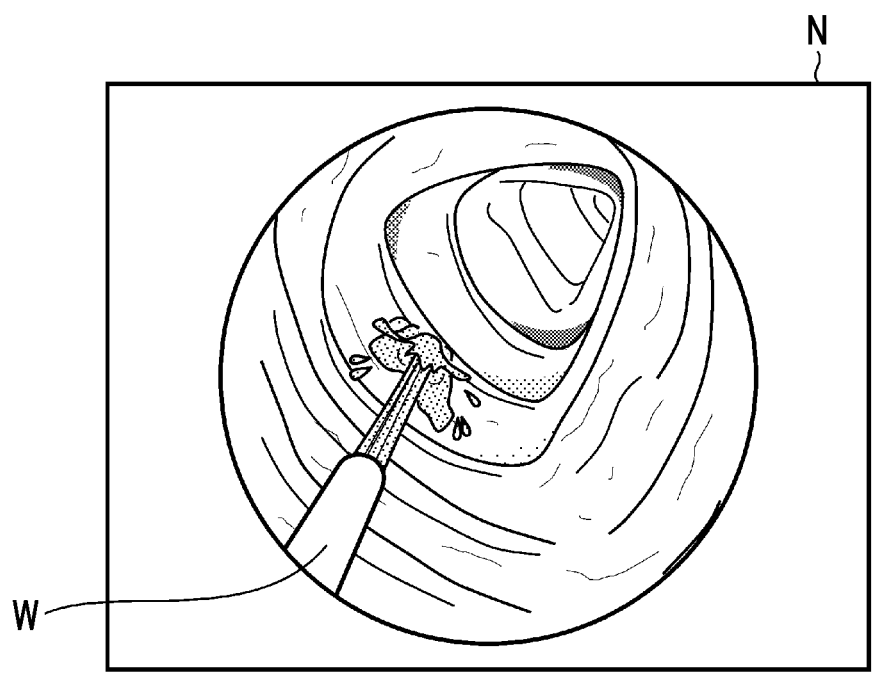
FIG. 8 is a diagram illustrating a case where an operation situation recognition unit recognizes the execution of water supply.

FIG. 8 is a diagram illustrating a case where the operation situation recognition unit 20 recognizes the execution of water supply.

An image in which water supply is executed is shown in a frame N shown in FIG. 8. Specifically, a water supply nozzle W is shown in the frame N and water is jetted from the distal end of the water supply nozzle W. In a case where the frame N is input to the operation situation recognition unit 20, the operation situation recognition unit 20 detects the execution of water supply (special operation) and recognizes the operation situation of the endoscope apparatus 500.

Figure 9:
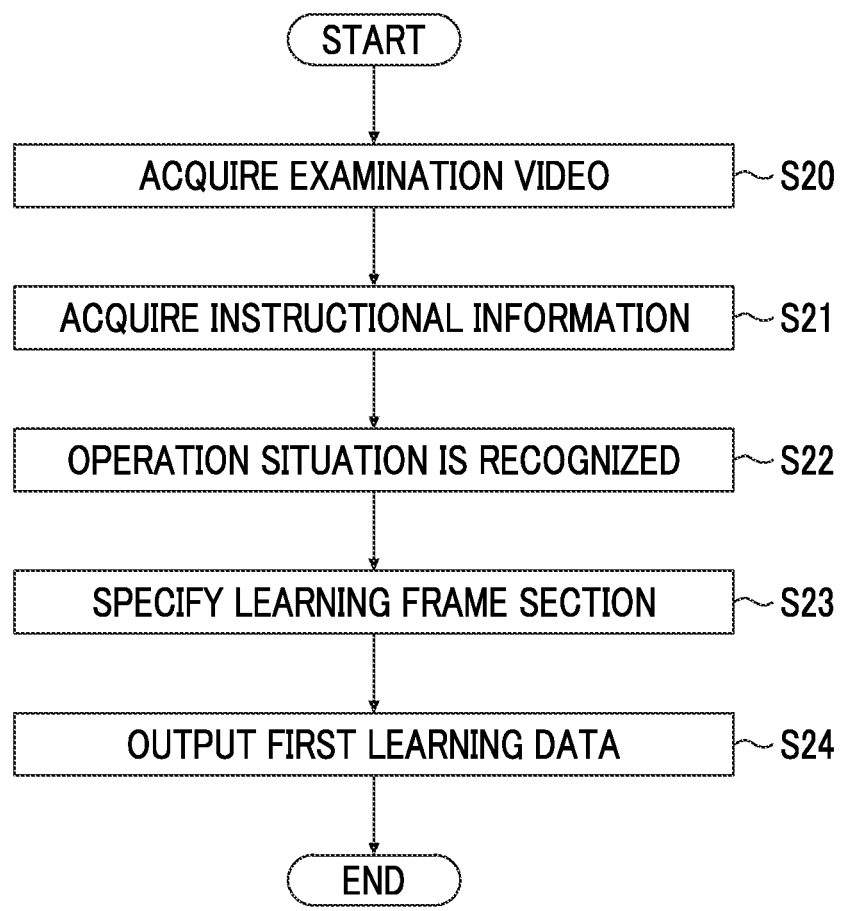
FIG. 9 is a flowchart showing an image processing method that is performed using the image processing device.

FIG. 9 is a flowchart showing an image processing method that is performed using the image processing device 10 according to this embodiment. The first processor 1 and the second processor 2 of the image processing device 10 execute a program stored in the storage unit 11, so that the image processing method is performed.

First, the examination video acquisition unit 12 acquires an examination video M (video acquisition step: Step S20). Further, the instructional information acquisition unit 14 acquires instructional information P that is acquired from the endoscope apparatus 500 of the examination video M (instructional information acquisition step: Step S21). Furthermore, the examination video M is input to the operation situation recognition unit 20 and the operation situation recognition unit 20 outputs the recognition result of an operation situation (operation situation recognition step: Step S22). After that, the learning frame section-specification unit 16 specifies learning frame sections from a plurality of frames forming the examination video M on the basis of the instructional information P and the recognition result of the operation situation (learning frame section-specification step: Step S23). Then, the first learning data output unit 18 outputs frame groups of the learning frame sections as first learning data (first learning data-output step: Step S24).

Figure 10:
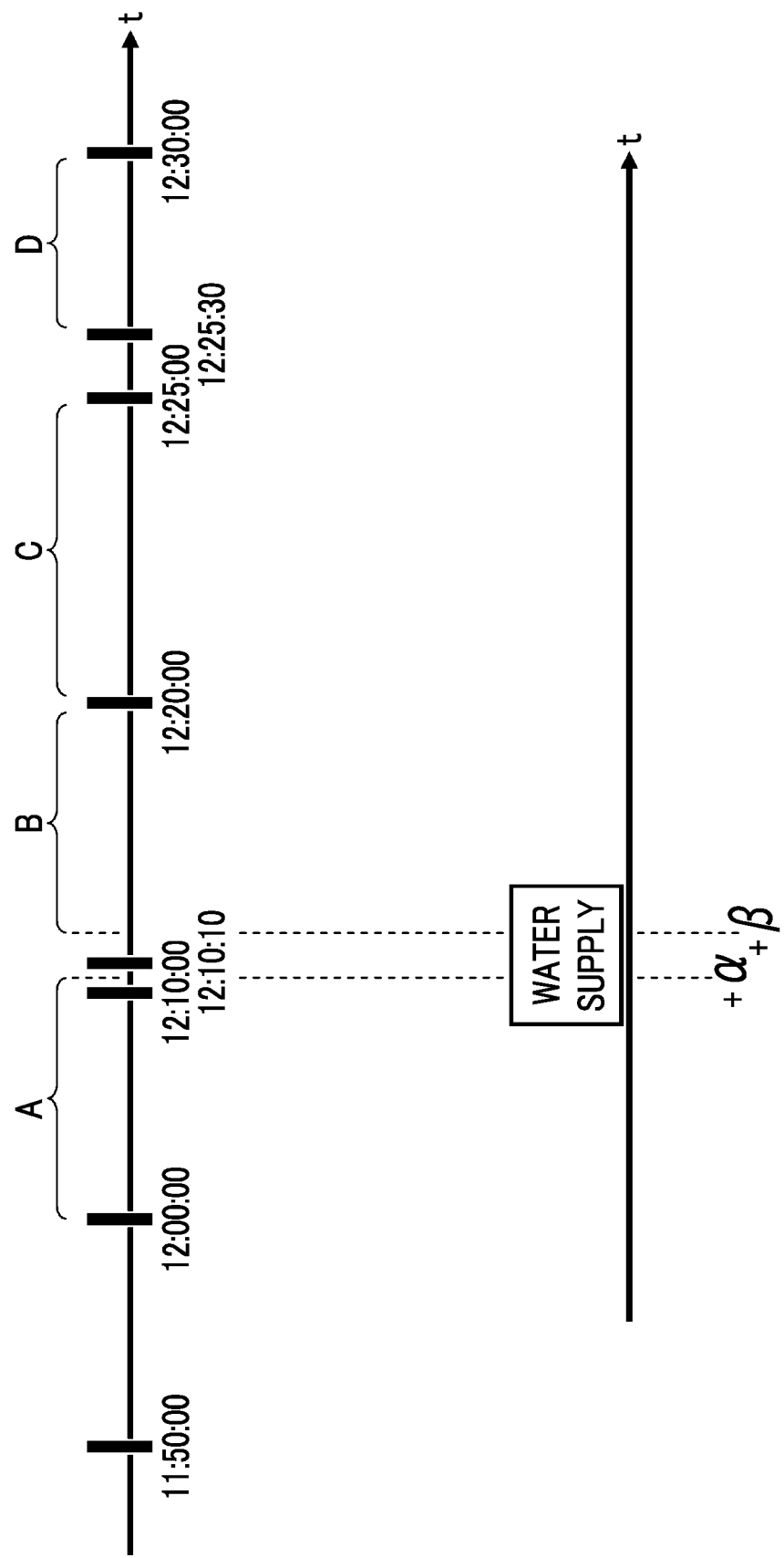
FIG. 10 is a diagram illustrating learning frame sections that are specified by a learning frame section-specification unit.

FIG. 10 is a diagram illustrating the learning frame sections that are specified by the learning frame section-specification unit 16 of this embodiment. Components already described in FIG. 6 will be denoted by the same reference numerals as described above and the description thereof will be omitted. Further, the instructional information acquisition unit 14 acquires operation logs Q as in a case where a description is made in FIG. 6.

The learning frame section-specification unit 16 specifies a section between reaching the ileocecum (12:00:00) and the start of water supply (12:10:00) in the examination video M as the learning frame section (A). Further, the operation situation recognition unit 20 recognizes the execution of water supply from the input examination video M. Specifically, the operation situation recognition unit 20 detects the start of water supply at a time point that is delayed by +α from the time point of the start of water supply of the operation logs Q. Accordingly, in this case, the learning frame section-specification unit 16 extends the learning frame section (A) by +α from the start of water supply (12:10:00). Therefore, frames including normal images, which can be used for machine learning, can be included in the learning frame section (A) without omission.

Further, the operation situation recognition unit 20 detects the end of water supply at a time point that is delayed by +β from the time point of the end of water supply of the operation logs Q. Accordingly, in this case, the learning frame section-specification unit 16 shortens the learning frame section (B) by +β from the end of water supply (12:10:10). Accordingly, it is possible to suppress the inclusion of a frame, which includes an abnormal image in which water supply (special operation) is performed, in the learning frame section.

Since there may be a time lag until an operation stored in the operation logs Q is actually reflected on a screen as described above, the image recognition result of the operation situation recognition unit 20 is supplementarily used in this embodiment to specify a learning frame section. Accordingly, a learning frame section formed of a normal image suitable for machine learning can be more accurately specified in this embodiment.

Third Embodiment

Next, a third embodiment will be described. In this embodiment, first learning data output from a first learning data output unit 18 are further input to a lesion detector 22 and frames other than a frame, in which a lesion is detected, are output as second learning data.

Figure 11:
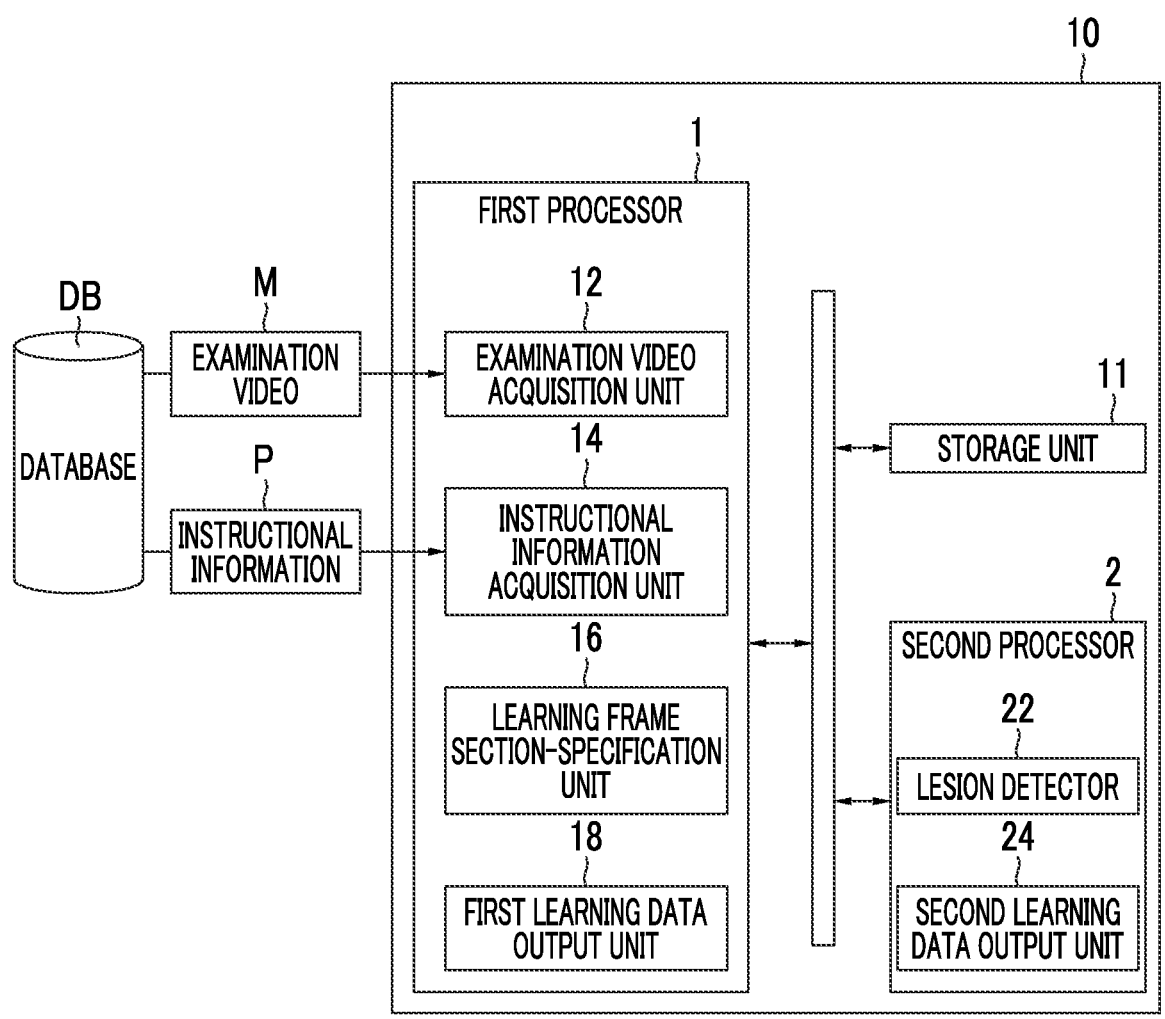
FIG. 11 is a block diagram showing the main configuration of an image processing device.

FIG. 11 is a block diagram showing the main configuration of an image processing device 10 according to this embodiment. Components already described in FIGS. 1 and 7 will be denoted by the same reference numerals as described above and the description thereof will be omitted.

The image processing device 10 includes a first processor 1, a storage unit 11, and a second processor 2. The first processor 1 and the second processor 2 may be formed of the same CPUs (or GPUs) or may be formed of different CPUs (or GPUs). The first processor 1 and the second processor 2 realize the respective functions shown in a functional block by executing a program stored in the storage unit 11.

The first processor 1 includes an examination video acquisition unit 12, an instructional information acquisition unit 14, a learning frame section-specification unit 16, and a first learning data output unit 18. The second processor 2 includes a lesion detector 22 and a second learning data output unit 24.

A publicly known lesion detector 22 is used as the lesion detector 22. For example, the lesion detector 22 is formed of a trained model subjected to machine learning for lesion detection.

First learning data output from the first learning data output unit 18 are input to the lesion detector 22. Then, the lesion detector 22 detects a frame in which a lesion is shown from the first learning data.

Here, the first learning data are specified to be formed of only normal images on the basis of operation logs Q. However, even in a case where an operator does not perform a special operation, a lesion or the like may be accidentally shown in a frame. Accordingly, the first learning data output from the first learning data output unit 18 are input to the lesion detector 22 so that the lesion detector 22 detects a lesion. Then, the second learning data output unit 24 outputs frames other than a frame in which a lesion is detected by the lesion detector 22 as the second learning data.

Figure 12:
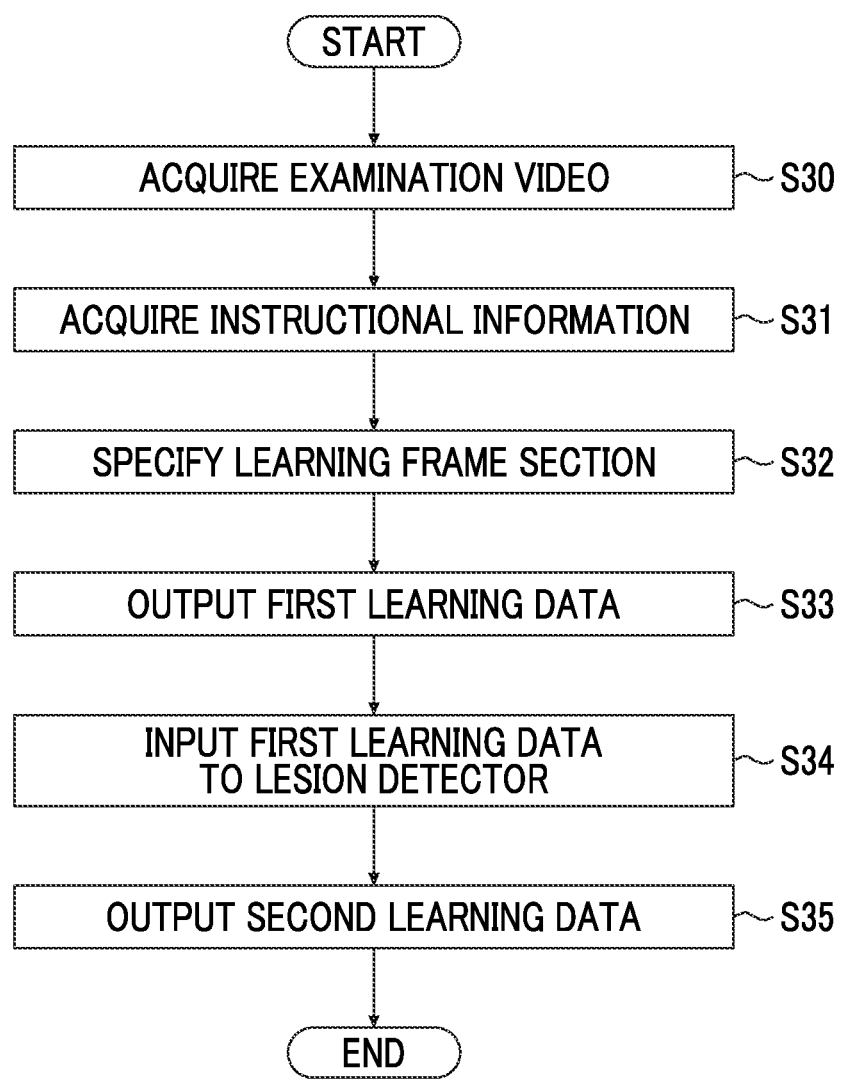
FIG. 12 is a flowchart showing an image processing method that is performed using the image processing device.

FIG. 12 is a flowchart showing an image processing method that is performed using the image processing device 10 according to this embodiment. The first processor 1 and the second processor of the image processing device 10 execute a program stored in the storage unit 11, so that the image processing method is performed.

First, the examination video acquisition unit 12 acquires an examination video M (video acquisition step: Step S30). Further, the instructional information acquisition unit 14 acquires instructional information P that is acquired from the endoscope apparatus 500 of the examination video M (instructional information acquisition step: Step S31). After that, the learning frame section-specification unit 16 specifies learning frame sections from a plurality of frames forming the examination video M on the basis of the instructional information P (learning frame section-specification step: Step S32). Then, the first learning data output unit 18 outputs frame groups of the learning frame sections as first learning data (first learning data-output step: Step S33). After that, the first learning data are input to the lesion detector 22 (lesion detection step: Step S34). Then, the second learning data output unit 24 outputs second learning data on the basis of the detection result of the lesion detector 22 (second learning data-output step: Step S35).

As described above, in this embodiment, the first learning data output from the first learning data output unit 18 are input to the lesion detector 22 and frame groups formed of frames other than a frame in which a lesion is detected are output as the second learning data. Accordingly, it is possible to accurately output learning data formed of frames each of which has a normal image.

Next, the endoscope apparatus 500 that generates the examination video M and the instructional information P described above will be described.

Overall Configuration of Endoscope Apparatus

The examination video M and the instructional information P used in the technique of the present disclosure are acquired by the endoscope apparatus (endoscope system) 500 to be described below, and are then stored in the database DB. The endoscope apparatus 500 to be described below is an example and an endoscope apparatus is not limited thereto.

Figure 13:
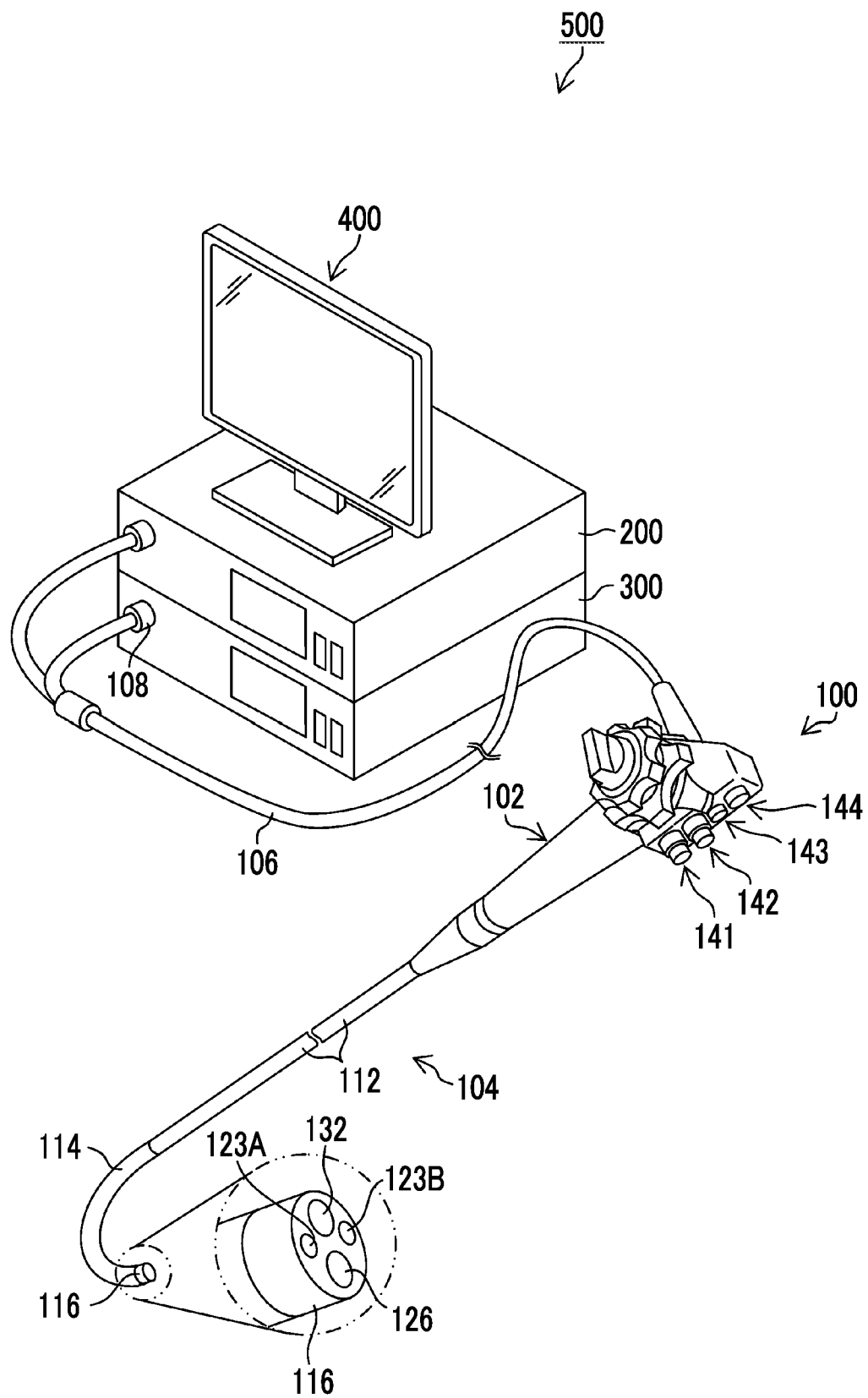
FIG. 13 is a diagram illustrating overall configuration of an endoscope apparatus.

FIG. 13 is a diagram illustrating overall configuration of the endoscope apparatus 500.

The endoscope apparatus 500 comprises an endoscope body 100, a processor device 200, a light source device 300, and a display device 400. A part of the hard distal end part 116 provided on the endoscope body 100 is enlarged and shown in FIG. 13.

The endoscope body 100 comprises a hand operation unit 102 and a scope 104. A user grips and operates the hand operation unit 102, inserts the insertion unit (scope) 104 into the body of an object to be examined, and observes the inside of the body of the object to be examined A user is synonymous with a medical doctor, an operator, and the like. Further, the object to be examined mentioned here is synonymous with a patient and an examinee.

The hand operation unit 102 comprises an air/water supply button 141, a suction button 142, a function button 143, and an image pickup button 144. The air/water supply button 141 receives operations of an instruction to supply air and an instruction to supply water.

The suction button 142 receives a suction instruction. Various functions are assigned to the function button 143. The function button 143 receives instructions for various functions. The image pickup button 144 receives an image pickup instruction operation. Image pickup includes picking up a video and picking up a static image.

The scope (insertion unit) 104 comprises a soft part 112, a bendable part 114, and a hard distal end part 116. The soft part 112, the bendable part 114, and the hard distal end part 116 are arranged in the order of the soft part 112, the bendable part 114, and the hard distal end part 116 from the hand operation unit 102. That is, the bendable part 114 is connected to the proximal end side of the hard distal end part 116, the soft part 112 is connected to the proximal end side of the bendable part 114, and the hand operation unit 102 is connected to the proximal end side of the scope 104.

A user can operate the hand operation unit 102 to bend the bendable part 114 and to change the orientation of the hard distal end part 116 vertically and horizontally. The hard distal end part 116 comprises an image pickup unit, an illumination unit, and a forceps port 126.

Figure 14:
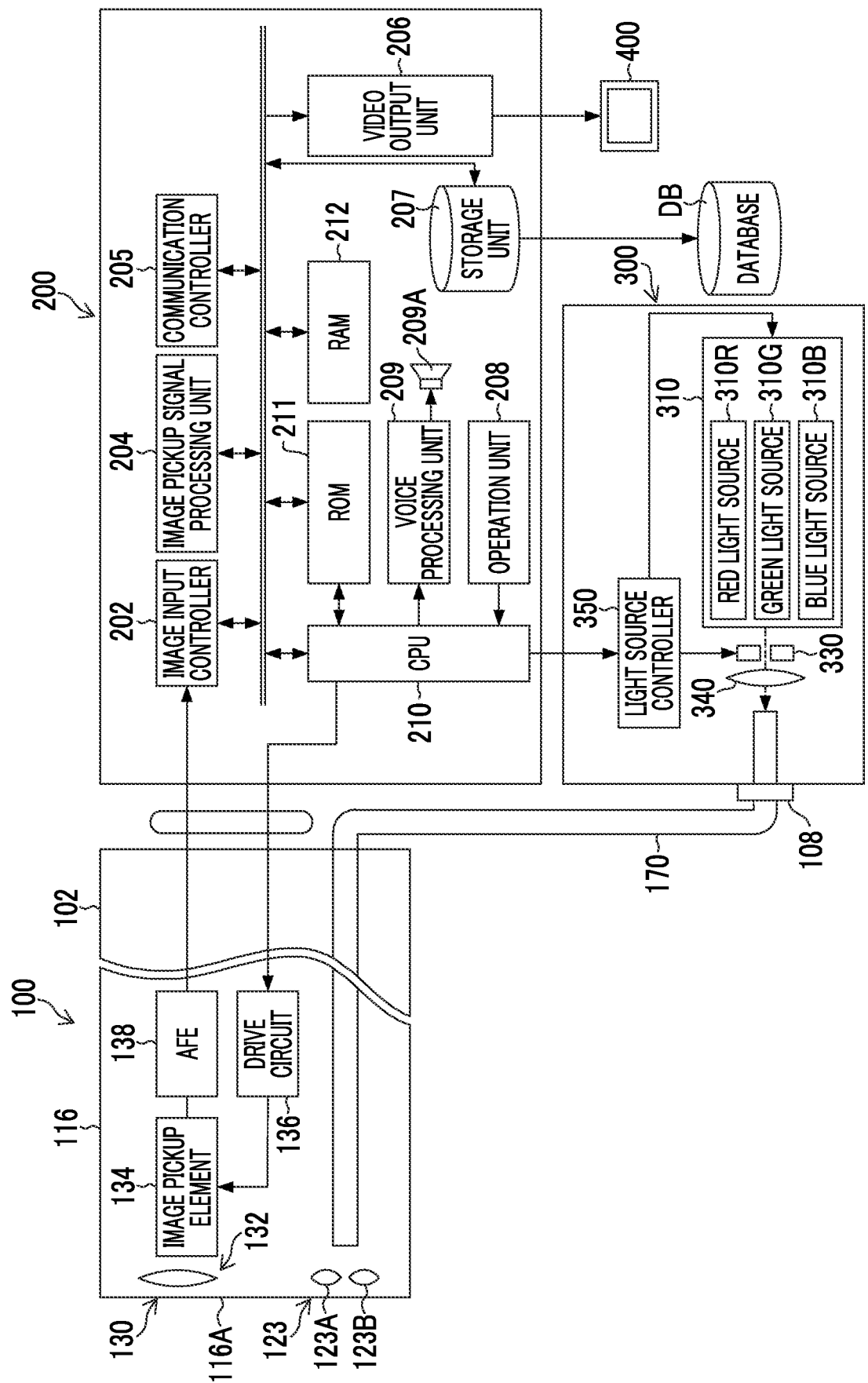
FIG. 14 is a functional block diagram of the endoscope apparatus.

An image pickup lens 132 of the image pickup unit is shown in FIG. 13. Further, an illumination lens 123A and an illumination lens 123B of the illumination unit are shown in FIG. 13. The image pickup unit is denoted by reference numeral 130 and is shown in FIG. 14. Furthermore, the illumination unit is denoted by reference numeral 123 and is shown in FIG. 14.

During an observation and a treatment, at least one of white light (normal light) or narrow-band light (special light) is output via the illumination lenses 123A and 123B according to the operation of an operation unit 208 shown in FIG. 14.

In a case where the air/water supply button 141 is operated, washing water is discharged from a water supply nozzle or gas is discharged from an air supply nozzle. The washing water and the gas are used to wash the illumination lens 123A and the like. The water supply nozzle and the air supply nozzle are not shown. The water supply nozzle and the air supply nozzle may be made common.

The forceps port 126 communicates with a pipe line. A treatment tool is inserted into the pipe line. A treatment tool is supported to be capable of appropriately moving forward and backward. In a case where a tumor or the like is to be removed, a treatment tool is applied and required treatment is performed. Reference numeral 106 shown in FIG. 13 denotes a universal cable. Reference numeral 108 denotes a light guide connector.

FIG. 14 is a functional block diagram of the endoscope apparatus 500. The endoscope body 100 comprises an image pickup unit 130. The image pickup unit 130 is disposed in the hard distal end part 116. The image pickup unit 130 comprises an image pickup lens 132, an image pickup element 134, a drive circuit 136, and an analog front end 138. AFE is an abbreviation for Analog front end.

The image pickup lens 132 is disposed on a distal end-side end surface 116A of the hard distal end part 116. The image pickup element 134 is disposed at a position on one side of the image pickup lens 132 opposite to the distal end-side end surface 116A. A CMOS type image sensor is applied as the image pickup element 134. A CCD type image sensor may be applied as the image pickup element 134. CMOS is an abbreviation for Complementary Metal-Oxide Semiconductor. CCD is an abbreviation for Charge Coupled Device.

A color image pickup element is applied as the image pickup element 134. Examples of a color image pickup element include an image pickup element that comprises color filters corresponding to RGB. RGB is the initial letters of red, green, and yellow written in English.

A monochrome image pickup element may be applied as the image pickup element 134. In a case where a monochrome image pickup element is applied as the image pickup element 134, the image pickup unit 130 may switch the wavelength range of the incident light of the image pickup element 134 to perform field-sequential or color-sequential image pickup.

The drive circuit 136 supplies various timing signals, which are required for the operation of the image pickup element 134, to image pickup element 134 on the basis of control signals transmitted from the processor device 200.

The analog front end 138 comprises an amplifier, a filter, and an AD converter. AD is the initial letters of analog and digital written in English. The analog front end 138 performs processing, such as amplification, noise rejection, and analog-to-digital conversion, on the output signals of the image pickup element 134. The output signals of the analog front end 138 are transmitted to the processor device 200. AFE shown in FIG. 14 is an abbreviation for Analog front end written in English.

An optical image of an object to be observed is formed on the light-receiving surface of the image pickup element 134 through the image pickup lens 132. The image pickup element 134 converts the optical image of the object to be observed into electrical signals. Electrical signals output from the image pickup element 134 are transmitted to the processor device 200 via a signal line.

The illumination unit 123 is disposed in the hard distal end part 116. The illumination unit 123 comprises an illumination lens 123A and an illumination lens 123B. The illumination lenses 123A and 123B are disposed on the distal end-side end surface 116A at positions adjacent to the image pickup lens 132.

The illumination unit 123 comprises a light guide 170. An emission end of the light guide 170 is disposed at a position on one side of the illumination lenses 123A and 123B opposite to the distal end-side end surface 116A.

The light guide 170 is inserted into the scope 104, the hand operation unit 102, and the universal cable 106 shown in FIG. 13. An incident end of the light guide 170 is disposed in the light guide connector 108.

The processor device 200 comprises an image input controller 202, an image pickup signal processing unit 204, and a video output unit 206. The image input controller 202 acquires electrical signals that are transmitted from the endoscope body 100 and correspond to the optical image of the object to be observed.

The image pickup signal processing unit 204 generates an endoscopic image and an examination video of the object to be observed on the basis of image pickup signals that are the electrical signals corresponding to the optical image of the object to be observed.

The image pickup signal processing unit 204 may perform image quality correction in which digital signal processing, such as white balance processing and shading correction processing, is applied to the image pickup signals. The image pickup signal processing unit 204 may add accessory information, which is defined by the DICOM standard, to frames forming an endoscopic image or an examination video. DICOM is an abbreviation for Digital Imaging and Communications in Medicine.

The video output unit 206 transmits display signals, which represent an image generated using the image pickup signal processing unit 204, to the display device 400. The display device 400 displays the image of the object to be observed.

In a case where the image pickup button 144 shown in FIG. 13 is operated, the processor device 200 operates the image input controller 202, the image pickup signal processing unit 204, and the like in response to an image pickup command signal transmitted from the endoscope body 100.

In a case where the processor device 200 acquires a freeze command signal indicating the pickup of a static image from the endoscope body 100, the processor device 200 applies the image pickup signal processing unit 204 to generate a static image based on a frame image obtained at an operation timing of the image pickup button 144. The processor device 200 uses the display device 400 to display the static image.

The processor device 200 comprises a communication controller 205. The communication controller 205 controls communication with devices that are communicably connected via an in-hospital system, an in-hospital LAN, and the like. A communication protocol based on the DICOM standard may be applied as the communication controller 205. Examples of the in-hospital system include a hospital information system (HIS). LAN is an abbreviation for Local Area Network.

The processor device 200 comprises a storage unit 207. The storage unit 207 stores endoscopic images and examination videos generated using the endoscope body 100. The storage unit 207 may store various types of information incidental to the endoscopic images and the examination videos. Specifically, the storage unit 207 stores instructional information, such as operation logs in the pickup of the endoscopic images and the examination videos. The instructional information, such as the endoscopic images, the examination videos, and the operation logs stored in the storage unit 207, is stored in the database DB.

The processor device 200 comprises an operation unit 208. The operation unit 208 outputs a command signal corresponding to a user's operation. A keyboard, a mouse, a joystick, and the like may be applied as the operation unit 208.

The processor device 200 comprises a voice processing unit 209 and a speaker 209A. The voice processing unit 209 generates voice signals that represent information notified as voice. The speaker 209A converts the voice signals, which are generated using the voice processing unit 209, into voice. Examples of voice output from the speaker 209A include a message, voice guidance, warning sound, and the like.

The processor device 200 comprises a CPU 210, a ROM 211, and a RAM 212. ROM is an abbreviation for Read Only Memory. RAM is an abbreviation for Random Access Memory.

The CPU 210 functions as an overall controller for the processor device 200. The CPU 210 functions as a memory controller that controls the ROM 211 and the RAM 212. Various programs, control parameters, and the like to be applied to the processor device 200 are stored in the ROM 211.

The RAM 212 is applied to a temporary storage area for data of various types of processing and a processing area for calculation processing using the CPU 210. The RAM 212 may be applied to a buffer memory in a case where an endoscopic image is acquired.

Hardware Configuration of Processor Device

A computer may be applied as the processor device 200. The following hardware may be applied as the computer, and the computer may realize the function of the processor device 200 by executing a prescribed program. The program is synonymous with software.

In the processor device 200, various processors may be applied as a signal processing unit for performing signal processing. Examples of the processor include a CPU and a graphics processing unit (GPU). The CPU is a general-purpose processor that functions as a signal processing unit by executing a program. The GPU is a processor specialized in image processing. An electric circuit in which electric circuit elements such as semiconductor elements are combined is applied as the hardware of the processor. Each controller comprises a ROM in which programs and the like are stored and a RAM that is a work area or the like for various types of calculation.

Two or more processors may be applied to one signal processing unit. Two or more processors may be the same type of processors or may be different types of processors. Further, one processor may be applied to a plurality of signal processing units. The processor device 200 described in the embodiment corresponds to an example of an endoscope controller.

Configuration Example of Light Source Device

The light source device 300 comprises a light source 310, a stop 330, a condenser lens 340, and a light source controller 350. The light source device 300 causes observation light to be incident on the light guide 170. The light source 310 comprises a red light source 310R, a green light source 310G, and a blue light source 310B. The red light source 310R, the green light source 310G, and the blue light source 310B emit red narrow-band light, green narrow-band light, and blue narrow-band light, respectively.

The light source 310 may generate illumination light in which red narrow-band light, green narrow-band light, and blue narrow-band light are arbitrarily combined. For example, the light source 310 may combine red narrow-band light, green narrow-band light, and blue narrow-band light to generate white light. Further, the light source 310 may combine arbitrary two of red narrow-band light, green narrow-band light, and blue narrow-band light to generate narrow-band light. Here, white light is light used for normal endoscopy and is called normal light, and narrow-band light is called special light.

The light source 310 may use arbitrary one of red narrow-band light, green narrow-band light, and blue narrow-band light to generate narrow-band light. The light source 310 may selectively switch and emit white light or narrow-band light. The light source 310 may comprise an infrared light source that emits infrared light, an ultraviolet light source that emits ultraviolet light, and the like.

The light source 310 may employ an aspect in which a light source comprises a white light source for emitting white light, a filter allowing white light to pass therethrough, and a filter allowing narrow-band light to pass therethrough. The light source 310 of such an aspect may switch the filter that allows white light to pass therethrough and the filter that allows narrow-band light to pass therethrough to selectively emit any one of white light or narrow-band light.

The filter that allows narrow-band light to pass therethrough may include a plurality of filters corresponding to different wavelength ranges. The light source 310 may selectively switch the plurality of filters, which corresponds to different wavelength ranges, to selectively emit a plurality of types of narrow-band light having different wavelength ranges.

The type, the wavelength range, and the like of the light source 310 may be applied depending on the type of an object to be observed, the purpose of observation, and the like. Examples of the type of the light source 310 include a laser light source, a xenon light source, a LED light source, and the like. LED is an abbreviation for Light-Emitting Diode.

In a case where the light guide connector 108 is connected to the light source device 300, observation light emitted from the light source 310 reaches the incident end of the light guide 170 via the stop 330 and the condenser lens 340. An object to be observed is irradiated with observation light via the light guide 170, the illumination lens 123A, and the like.

The light source controller 350 transmits control signals to the light source 310 and the stop 330 on the basis of the command signal transmitted from the processor device 200. The light source controller 350 controls the illuminance of observation light emitted from the light source 310, the switching of the observation light, ON/OFF of the observation light, and the like.

Change of Light Source

In the endoscope apparatus 500, light of a white-light wavelength range or normal light, which is obtained in a case where light of a plurality of wavelength ranges is applied as light of a white-light wavelength range, can be used as a light source. On the other hand, the endoscope apparatus 500 also can apply light (special light) of a specific wavelength range. Specific examples of the specific wavelength range will be described below.

First Example

A first example of the specific wavelength range is a blue-light wavelength range or a green-light wavelength range in a visible-light wavelength range. The wavelength range of the first example includes a wavelength range of 390 nm or more and 450 nm or less or a wavelength range of 530 nm or more and 550 nm or less, and light of the first example has a peak wavelength in a wavelength range of 390 nm or more and 450 nm or less or a wavelength range of 530 nm or more and 550 nm or less.

Second Example

A second example of the specific wavelength range is a red-light wavelength range in a visible-light wavelength range. The wavelength range of the second example includes a wavelength range of 585 nm or more and 615 nm or less or a wavelength range of 610 nm or more and 730 nm or less, and light of the second example has a peak wavelength in a wavelength range of 585 nm or more and 615 nm or less or a wavelength range of 610 nm or more and 730 nm or less.

Third Example

A third example of the specific wavelength range includes a wavelength range where a light absorption coefficient in oxygenated hemoglobin and a light absorption coefficient in reduced hemoglobin are different from each other, and light of the third example has a peak wavelength in a wavelength range where a light absorption coefficient in oxygenated hemoglobin and a light absorption coefficient in reduced hemoglobin are different from each other. The wavelength range of the third example includes a wavelength range of 400±10 nm, 440±10 nm, 470±10 nm, or 600 nm or more and 750 nm or less, and the light of the third example has a peak wavelength in a wavelength range of 400±10 nm, 440±10 nm, 470±10 nm, or 600 nm or more and 750 nm or less.

Fourth Example

A fourth example of the specific wavelength range is the wavelength range of excitation light that is used for the observation of fluorescence emitted from a fluorescent material in a living body and excites the fluorescent material. The fourth example of the specific wavelength range is a wavelength range of, for example, 390 nm or more and 470 nm or less. The observation of fluorescence may be referred to as fluorescence observation.

Fifth Example

A fifth example of the specific wavelength range is the wavelength range of infrared light. The wavelength range of the fifth example includes a wavelength range of 790 nm or more and 820 nm or less or 905 nm or more and 970 nm or less, and light of the fifth example has a peak wavelength in a wavelength range of 790 nm or more and 820 nm or less or 905 nm or more and 970 nm or less.

Example of Generation of Special Light Image

The processor device 200 may generate a special light image, which has information about the specific wavelength range, on the basis of a normal light image that is picked up using white light. Generation mentioned here includes acquisition. In this case, the processor device 200 functions as a special light image-acquisition unit. Then, the processor device 200 obtains signals in the specific wavelength range by performing calculation based on color information of red, green and blue, or cyan, magenta, and yellow included in the normal light image. Cyan, magenta, and yellow may be expressed as CMY using the initial letters of cyan, magenta, and yellow written in English.

Others

In the embodiments, the hardware structures of processing units (the first processor 1 and the second processor 2), which perform various types of processing, are various processors to be described below. The various processors include: a central processing unit (CPU) that is a general-purpose processor functioning as various processing units by executing software (program); a programmable logic device (PLD) that is a processor of which circuit configuration can be changed after manufacture, such as a field programmable gate array (FPGA); a dedicated electrical circuit that is a processor having circuit configuration designed exclusively to perform specific processing, such as an application specific integrated circuit (ASIC); and the like.

The first processor 1 and/or the second processor 2 may be formed of one of these various processors, or may be formed of two or more same type or different types of processors (for example, a plurality of FPGAs or a combination of a CPU and an FPGA). Further, a plurality of processing units may be formed of one processor. As an example where a plurality of processing units are formed of one processor, first, there is an aspect where one processor is formed of a combination of one or more CPUs and software as typified by a computer, such as a client or a server, and functions as a plurality of processing units. Second, there is an aspect where a processor implementing the functions of the entire system, which includes a plurality of processing units, by one integrated circuit (IC) chip is used as typified by System On Chip (SoC) or the like. In this way, various processing units are formed using one or more of the above-mentioned various processors as hardware structures.

In addition, the hardware structures of these various processors are more specifically electrical circuitry where circuit elements, such as semiconductor elements, are combined.

Each configuration and function having been described above can be appropriately realized by arbitrary hardware, arbitrary software, or a combination of both arbitrary hardware and arbitrary software. For example, the present invention can also be applied to a program that causes a computer to perform the above-mentioned processing steps (processing procedure), a computer-readable recording medium (non-transitory recording medium) in which such a program is recorded, or a computer in which such a program can be installed.

The embodiments of the present invention have been described above, but it goes without saying that the present invention is not limited to the above-mentioned embodiments and may have various modifications without departing from the scope of the present invention.

EXPLANATION OF REFERENCES

1: first processor
2: second processor
10: image processing device
11: storage unit
12: examination video acquisition unit
14: instructional information acquisition unit
16: learning frame section-specification unit
18: first learning data output unit
20: operation situation recognition unit
22: lesion detector
24: second learning data output unit

What is claimed is:

1. An image processing device comprising:
a processor configured to:
acquire an examination video picked up by an endoscope apparatus;
acquire instructional information of the endoscope apparatus in the pickup of the examination video;
specify a learning frame section from a plurality of frames forming the examination video on the basis of the instructional information; and
output a frame group of the learning frame section as first learning data.

2. The image processing device according to claim 1, wherein the processor is further configured to specify a section, in which a special operation is not performed, as the learning frame section on the basis of the instructional information.

3. The image processing device according to claim 1, wherein the instructional information includes observation start information indicating that an observation is started, and
the processor is further configured to specify the learning frame section on the basis of the observation start information.

4. The image processing device according to claim 1, wherein the instructional information includes detection information indicating that a specific portion of an organ to be examined is detected, and
the processor is further configured to specify the learning frame section on the basis of the detection information.

5. The image processing device according to claim 1, wherein the instructional information includes special instructional information indicating at least one of execution of water supply, execution of air supply, execution of suction, light source switching, a use of a treatment tool, execution of staining, or special insertion, and
the processor is further configured to specify the learning frame section on the basis of the special instructional information.

6. The image processing device according to claim 5, wherein the processor is further configured to specify the learning frame section on the basis of a plurality of pieces of the special instructional information.

7. The image processing device according to claim 1, wherein the instructional information includes information about a time-series insertion length of a scope of the endoscope apparatus, and
the processor is further configured to specify the learning frame section in a case where an amount of change in the insertion length is in a range of a first threshold value.

8. The image processing device according to claim 1, wherein the instructional information includes static image pickup information indicating that a static image is picked up by the endoscope apparatus, and
the processor is further configured to specify the learning frame section on the basis of the static image pickup information.

9. The image processing device according to claim 1, wherein the processor is further configured to:
recognize an operation situation of the endoscope apparatus on the basis of the frames forming the examination video; and
specify the learning frame section on the basis of a result of the recognition.

10. The image processing device according to claim 9, wherein the processor is further configured to:
recognize the operation situation of the endoscope apparatus by detecting a specific portion of an organ to be examined on the basis of the frames forming the examination video; and
specify a section, which is subsequent to the frame in which the specific portion is recognized, as the learning frame section.

11. The image processing device according to claim 9, wherein the processor is further configured to:
recognize the operation situation of the endoscope apparatus by detecting at least one special operation of execution of water supply, execution of suction, light source switching, a use of a treatment tool, execution of staining, or special insertion on the basis of the frames forming the examination video; and specify frames other than a frame, in which the special operation is recognized, as the learning frame section.

12. The image processing device according to claim 9, wherein the processor is further configured to:

recognize the operation situation of the endoscope apparatus by recognizing each portion of an organ to be examined on the basis of the frames forming the examination video; and specify the learning frame section on the basis of a result of the recognition.

13. The image processing device according to claim 1, wherein the processor is further configured to:

input the output first learning data to a lesion detector that detects a lesion; and output frames other than a frame, in which a lesion is detected by the lesion detector, as second learning data.

14. An image processing method of an image processing device including a processor, comprising:

acquiring an examination video picked up by an endoscope apparatus;

acquiring instructional information of the endoscope apparatus in the pickup of the examination video;

specifying a learning frame section from a plurality of frames forming the examination video on the basis of the instructional information; and outputting a frame group of the learning frame section as first learning data.

15. A non-transitory, computer-readable tangible recording medium which records thereon, a program for causing, when read by a computer, the computer to perform an image processing method comprising:

acquiring an examination video picked up by an endoscope apparatus;

acquiring instructional information of the endoscope apparatus in the pickup of the examination video;

specifying a learning frame section from a plurality of frames forming the examination video on the basis of the instructional information; and outputting a frame group of the learning frame section as first learning data.

* * * * *